(12) United States Patent
Folkers (10) Patent No.: US 10,420,634 B2
(45) Date of Patent: Sep. 24, 2019

(54) ANIMAL DETECTION SYSTEMS (71) Applicant: Fieldtech Limited, Te Awamutu (NZ)

(72) Inventor: Christianus Johannes Folkers, Hamilton (NZ)

(73) Assignee: FieldTech Ltd. (NZ)

( * ) Notice: Subject to any disclaimer, the term of this patent is extended or adjusted under 35 U.S.C. 154(b) by 681 days.

(21) Appl. No.: 14/901,971

(22) PCT Filed: Jul. 2, 2014

(86) PCT No.: PCT/NZ2014/000133
§ 371 (c)(1),
(2) Date: Dec. 29, 2015

(87) PCT Pub. No.: WO2015/002548
PCT Pub. Date: Jan. 8, 2015

(65) Prior Publication Data
US 2016/0143719 A1    May 26, 2016

(30) Foreign Application Priority Data
Jul. 2, 2013 (NZ) ........................................ 612739

(51) Int. Cl.
*A61D 17/00* (2006.01)
*A01K 11/00* (2006.01)

(52) U.S. Cl.
CPC .......... *A61D 17/002* (2013.01); *A01K 11/006* (2013.01)

(58) Field of Classification Search
CPC .... A01K 29/005; A01K 67/00; A01K 11/004; A61B 2503/40

(Continued)

(56) References Cited

U.S. PATENT DOCUMENTS 3,844,273 A * 10/1974 Polson ................. A61B 5/0008
119/51.02
4,247,758 A * 1/1981 Rodrian ............... A61B 5/1105
119/14.08

(Continued)

FOREIGN PATENT DOCUMENTS

WO     2012070958      5/2012

OTHER PUBLICATIONS

International Search Report in PCT/NZ2014/000133 (dated Nov. 7, 2014).

(Continued)

*Primary Examiner* — May A Abouelela
(74) *Attorney, Agent, or Firm* — Skinner and Associates; Joel Skinner (57) ABSTRACT

The invention relates to a detection tag for the detection of the reproductive status of animals. The detection tag includes two signal transmitters, one of which is activated when the animal is mounted by another animal and the other of which is always on. It can therefore be determined whether the tag is activated or missing. A detection tag in one embodiment comprises a first surface affixable to the hide of an animal, a second and opposite surface including abradable material, first and second electronic signal transmission means configured to transmit first and second electronic signals having detectably different characteristics, the detection tag being configured such that removal of some or all of the abradable material alters the ability of the detection tag to transmit the first signal or alters a characteristic of the first signal.

11 Claims, 3 Drawing Sheets

(58) Field of Classification Search
USPC ...... 600/33, 300, 546, 551; 119/174; 40/300
See application file for complete search history.

(56) References Cited

U.S. PATENT DOCUMENTS

| | | | | |
|---|---|---|---|---|
| 4,411,274 | A * | 10/1983 | Wright | A61B 5/117 600/551 |
| 4,503,808 | A * | 3/1985 | McAlister | A61D 17/002 600/551 |
| 4,635,587 | A * | 1/1987 | Leonardo | A61D 17/002 340/573.3 |
| 4,784,155 | A * | 11/1988 | Mills | A61B 5/0002 128/903 |
| 4,854,328 | A * | 8/1989 | Pollack | A61B 5/0008 600/549 |
| 4,895,165 | A * | 1/1990 | Blair | A61B 10/0012 600/551 |
| 5,111,799 | A | 5/1992 | Senger et al. | |
| 5,482,008 | A * | 1/1996 | Stafford | A01K 11/007 119/174 |
| 5,511,560 | A * | 4/1996 | Begouen | A61D 17/008 600/551 |
| 5,542,431 | A | 8/1996 | Starzl et al. | |
| 5,839,390 | A * | 11/1998 | Meads | A61D 17/002 119/174 |
| 6,467,430 | B1 * | 10/2002 | Stampe | A01K 11/00 119/174 |
| 7,083,575 | B1 * | 8/2006 | Claycomb | A61D 17/002 600/33 |
| 8,066,179 | B2 * | 11/2011 | Lowe | A01K 29/00 235/375 |
| 9,119,379 | B1 * | 9/2015 | Yancey | A61B 5/0004 |
| 9,754,137 | B2 * | 9/2017 | Debates | G06K 19/07345 |
| 2002/0026124 | A1 * | 2/2002 | Whitaker | A01K 11/00 600/551 |
| 2008/0110406 | A1 | 5/2008 | Anderson et al. | |
| 2009/0056637 | A1 * | 3/2009 | Gustafsson | A01K 1/12 119/174 |
| 2009/0094869 | A1 * | 4/2009 | Geissler | A01K 11/004 40/301 |
| 2009/0182207 | A1 * | 7/2009 | Riskey | A61B 5/0031 600/302 |
| 2013/0096369 | A1 | 4/2013 | Folkers | |
| 2013/0340305 | A1 * | 12/2013 | Mobley | A01K 29/005 40/300 |
| 2014/0163406 | A1 * | 6/2014 | Roosenboom | A01K 11/006 600/509 |

OTHER PUBLICATIONS

Written Opinion of the International Searching Authority in PCT/NZ2014/000133 (dated Nov. 7, 2014).

* cited by examiner

ANIMAL DETECTION SYSTEMS

This application is a U.S. National Stage filing under 35 U.S.C. § 371 of International Application No. PCT/NZ2014/000133, filed Jul. 2, 2014, and which claims priority to New Zealand Application No. 612739, filed Jul. 2, 2013.

FIELD OF INVENTION

The invention relates to an improved detection system. More particularly it relates to an improved detection system for detecting the reproductive state of animals, or for detecting animals that have been selected for a particular reason.

BACKGROUND TO THE INVENTION

The detection of the reproductive status of animals is highly desirable for farmers. It is especially desirable for a farmer to know when individual cows in a herd are 'in heat'. The early detection of cows in heat allows the farmer to improve his livestock by selective breeding and to better plan his business operations. This can be achieved by mating selected animals, using artificial insemination or any other suitable method. When using any of these methods, it is necessary to determine accurately and reliably when cows are in heat so that the cows in heat can be singled out and inseminated. The heat cycle of cows is active only for a short period of time and hence detection and insemination must be done within this period.

Various methods have been used in the prior art for the detection of cows 'in heat'. The most common method of detection used is visual observation whereby cows seen to allow mounting by other cows are separated from the herd by a farmer. However the farmer must quickly identify and mark the cows in heat since the heat cycle of a cow only lasts for a short period of time as mentioned above. This may be difficult in a large herd as cows are generally widely dispersed and 24 hour observation may be impossible. Therefore this method is time consuming, depends on the attentiveness and skill level of the farmer and, accordingly, the heat cycle of many cows may go undetected.

Another frequently used method of detection involves the application of paint on the tail-bone of a cow, where the subsequent smudging of this paint indicates that the cow was mounted by another animal. This method involves a skilled farmer closely observing each animal in order to detect which animals have been mounted and hence it is also very time consuming and is not very reliable in harsh weather conditions.

An alternative method is to use indicators on the backs or rumps of cows that are set off when other animals mount the cows in heat. In most cases, these methods incorporate some form of visual indicator such as a reflective device/tag that becomes exposed when mounting occurs or some sort of fluid reservoir that becomes discharged when mounting occurs. This means that these indicators still require some form of visual observation and interpretation by a skilled farmer in order to identify the animals in heat and hence the heat cycles of some animals of a large herd may still be missed due to delays or inaccuracies in checking.

Complicated systems incorporating image capture devices and software that interpret images using various algorithms have been developed so that the observation and interpretation of the indicators/tags is fully automated. However these 'automated visual detection systems' have some external requirements in order to function properly, such as suitable lighting conditions, exact positioning and 'line of sight' viewing for image capturing. Furthermore they include hardware that is expensive (digital cameras, computers, lighting systems, etc), is sensitive to fouling, dust or dirt and includes software interpretation modules that can be inherently difficult to develop to an accepted state of reliability. Also, the indicators/tags used in these systems frequently get covered in manure, dirt and other contaminants which make visual image processing error prone. Therefore a system which is completely insensitive to these types of disadvantages is required.

International Patent Application Number PCT/NZ2011/000097 describes a prior art system in which a tag able to transmit an electronic signal is attached to an animal. When another animal mounts the animal carrying the tag, an abradable layer is removed from the tag by one animal rubbing against the other. The whole or partial removal of the abradable layer alters the ability of the detection tag to transmit a signal, or it alters a characteristic of the signal, so that animals that have been mounted can be detected by a suitable signal receiver.

One problem with this system is that it is difficult to distinguish between an animal with a missing tag (e.g. the tag has fallen off) and an animal with an inactive tag because, in both cases, no signal is received. It would be desirable to be able to identify animals with missing tags in a different way to identifying animals with inactive tags.

PCT/NZ2011/000097 attempts to solve this problem using a tag in which the length of the antenna is changed when the tag is activated by a mounting animal so that the signal changes in frequency on activation. However this technique is prone to error if, for example, on activation, the length of the antenna only changes enough to alter the signal's frequency a small amount.

In another example, PCT/NZ2011/000097 describes the use of an "always-active" tag together with a tag that can be activated when the animal is mounted. However this system requires multiple tags on one animal and is therefore inefficient and costly. In addition, the presence of an always-active tag does not prevent the tag that can be activated from falling off.

In the prior art, once the cows 'in heat' have been identified, they are separated from the herd (referred to as 'drafting') for further treatment, e.g. artificial insemination. This drafting process is done either manually by a farm-worker handling a gate, or at various levels of automated drafting by automatically switching a gate when the cow concerned is present. Usually the drafting process is done during or after milking of the cow when the cow leaves the milking parlour through the exit race.

According to current farming practice, drafting is carried out using a three step process. The first step involves a skilled worker identifying the cows through visual identification. The second step involves manual or automated marking of cows. Manual marking of cows is done with, for example, shaving cream. In an automated system a cow ID is entered into a computer program instead of marking the cow with shaving cream. Typically this marking is done on cows when they enter the milking shed/platform.

The third step of drafting is carried out while the cows are exiting the milking platform by switching one or more gates. In the case of manual selection, a gate operator operates the gate when a marked cow (i.e.: a cow having shaving cream on its back) is seen at the gate entrance. In the case of automated selection, the system reads the cow ID when the cows are in the exit race (using a tag reader of a prior art animal identification system, e.g. RFID ear-tags used for identification of cows). After reading the cow's ID the automated system checks if the read cow ID was previously entered into the computer in step two and operates the gate accordingly.

The above described manual and automated methods of drafting have disadvantages similar to the methods used for detection of 'heat' in animals. For example manual visual drafting may not be accurate in a farm with a large herd of animals and automated drafting requires expensive hardware and software.

In other situations, animals may be selected while they are held in a stall, pen or race, for example when an inspector selects lambs that are suitable to go to the meat works. In such cases a visual mark is placed on the selected animals and those animals are drafted out manually. The operation takes a number of staff since some are required to encourage the animals through the drafting gates, while another controls the gates.

PCT/NZ2011/000097 describes improved drafting processes but these have disadvantages consequential to the disadvantages of the tags as discussed above. For example, if the detection tag has fallen off an animal that is 'in heat', the animal might be drafted incorrectly.

OBJECT OF THE INVENTION

It is an object of the invention to provide an improved detection system that addresses some of the disadvantages and limitations of the known art or at least to provide the public with a useful choice.

SUMMARY OF THE INVENTION

According to a first aspect of the invention, there is provided a detection tag for the detection of the reproductive status of animals, the detection tag comprising:
a first surface affixable to the hide of an animal;
a second and opposite surface including abradable material; and
first and second electronic signal transmission means configured to transmit first and second electronic signals having detectably different characteristics;
the detection tag being configured such that removal of some or all of the abradable material alters the ability of the detection tag to transmit the first signal or alters a characteristic of the first signal.

Preferably, removal of some or all of the abradable material allows or disallows transmission of the first signal.

More preferably, in one embodiment, the first signal is shielded by signal shielding means and removal of the abradable material allows transmission of the first signal.

Preferably, the first and second electronic signals have different frequencies.

In one embodiment of the invention, removal of some or all of the abradable material detectably alters the frequency and/or the frequency bandwidth and/or the amplitude of the first signal. Alternatively, or in addition, removal of some or all of the abradable material detectably alters the strength of the first signal.

In alternative embodiments, the detectably different characteristics of the first and second signals may comprise any one or more of:
a) differently coded signals;
b) differently time-divided signals;
c) signals detectable using different detection means; and/or
d) any other detectably different characteristic between two electronic signal transmissions.

These characteristics may differ between the first and second signals in addition to or instead of the different frequencies of the signals.

Preferably, each of the first and second electronic signal transmission means comprises a 'Radio Frequency Identification' (RFID), or a type of 'Electronic Article Surveillance' (EAS), electronic circuit or micro chip, including RFID EAS. A RFID circuit/chip may use low or high frequency radio frequency (RF) communication and a EAS circuit/chip may use radio frequency (RF), magnetic (magneto-harmonic), acousto-magnetic (magnetostrictive) or microwave communication.

Preferably, the abradable material includes the signal shielding means. The signal shielding means may comprise a conductive circuit and the detection tag may be configured such that partial or complete removal of the conductive circuit, or breaking of the conductive circuit, allows the transmission of the first signal.

More preferably, the conductive circuit of the detection tag is configured such that it is damaged or broken partially or completely when the animal is mounted by another animal.

Preferably, the conductive circuit is an RF/EMF blocking circuit/loop made from: aluminium foil, conductive paint, liquid conductive material, silver ink, or any other conductive material; and the circuit/loop shields the transmission of signals from the first electronic signal transmission means by forming an inductive loop.

Preferably, the detection tag comprises one or more patches of material positioned under the conductive circuit, the patch material being configured to aid abrasion or breaking of the conductive circuit where the conductive circuit passes over the one or more patches.

Preferably, the detection tag comprises a layer of protective material positioned over the conductive circuit, the layer of protective material having gaps therein positioned over the one or more patches.

In an alternative embodiment of the invention, the abradable material is a removable flood coat layer comprising signal shielding means.

Preferably, the flood coat layer covers part or all of the detection tag, including the first and second electronic transmission means, with the signal shielding means shielding only the first electronic signal transmission means.

More preferably, the signal shielding means comprises a layer of conductive material or RF/EMF shielding or absorbing material.

More preferably, the flood coat layer includes a plurality of layers, and at least one of the layers is the signal shielding means layer and at least one of the layers is a layer of latex material.

Preferably, the flood coat layer is configured to provide visual confirmation of mounting of the animal.

In some embodiments of the invention, the detection tag is thicker in the regions of the tag covered by the abradable material.

Preferably, the detection tag includes an adhesive layer on the first surface.

In one embodiment of the invention, the detection tag is substantially bone-shaped.

That is, the detection tag comprises two wings connected by a neck portion. The first and second electronic signal transmission means may be each positioned in a separate wing of the detection tag. A portion of the abradable material may be positioned on the neck portion of the detection tag. Furthermore, a portion of the conductive circuit may pass across or over the neck portion. The one or more patches may be positioned on or near the neck portion.

According to a second aspect of the invention there is provided a system for detecting the reproductive status of an animal, wherein the system comprises at least one detection tag according to the first aspect of the invention and at least one tag reading device and/or interpretation module which is configured to interpret the signals from the detection tag.

Preferably, the system further comprises means for detecting the presence of an animal in range of the at least one tag reading device.

According to a third aspect of the invention there is provided a method of detecting the reproductive state of an animal, the method comprising the steps of:
- affixing a detection tag according to the first aspect of the invention onto a female animal;
- allowing the animal to mingle with animals of the same type for a period of time;
- placing the animal in close proximity to one or more detection tag reading devices; and
- evaluating the presence or absence or specific characteristics of one or more signals from the detection tag, and making a determination as to the reproductive state of the animal.

According to a fourth aspect of the invention there is provided a method of drafting animals, the method comprising the steps of:
- affixing a detection tag according to the first aspect of the invention onto a female animal;
- allowing the animal to mingle with animals of the same type for a period of time;
- placing the animal in close proximity to one or more detection tag reading devices;
- evaluating the presence or absence or specific characteristics of one or more signals from the detection tag; and
- allowing the animal to be drafted to a correct location based on the detected signal(s).

According to a fifth aspect of the invention, there is provided a detection tag for the detection of the reproductive status of animals, the detection tag being affixable to an animal and comprising first and second electronic signal transmission means configured to transmit first and second electronic signals having detectably different characteristics, the detection tag being configured to be altered when the animal is mounted, such that the ability of the detection tag to transmit the first signal, or a characteristic of the first signal, is altered.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

One or more embodiments of the invention will be described below by way of example only, and without intending to be limiting, with reference to the following drawings, in which.

DETAILED DESCRIPTION OF PREFERRED EMBODIMENTS OF THE INVENTION

Conductive Circuit Version

Figure 1:
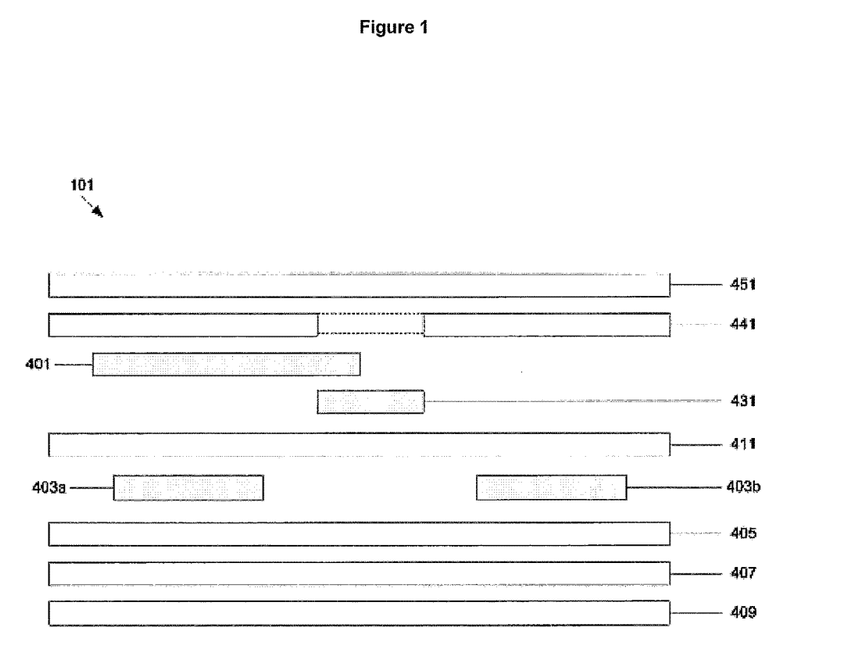
FIG. 1 is a cross-sectional side view diagram of a detection tag according to one embodiment of the invention.
Figure 2:
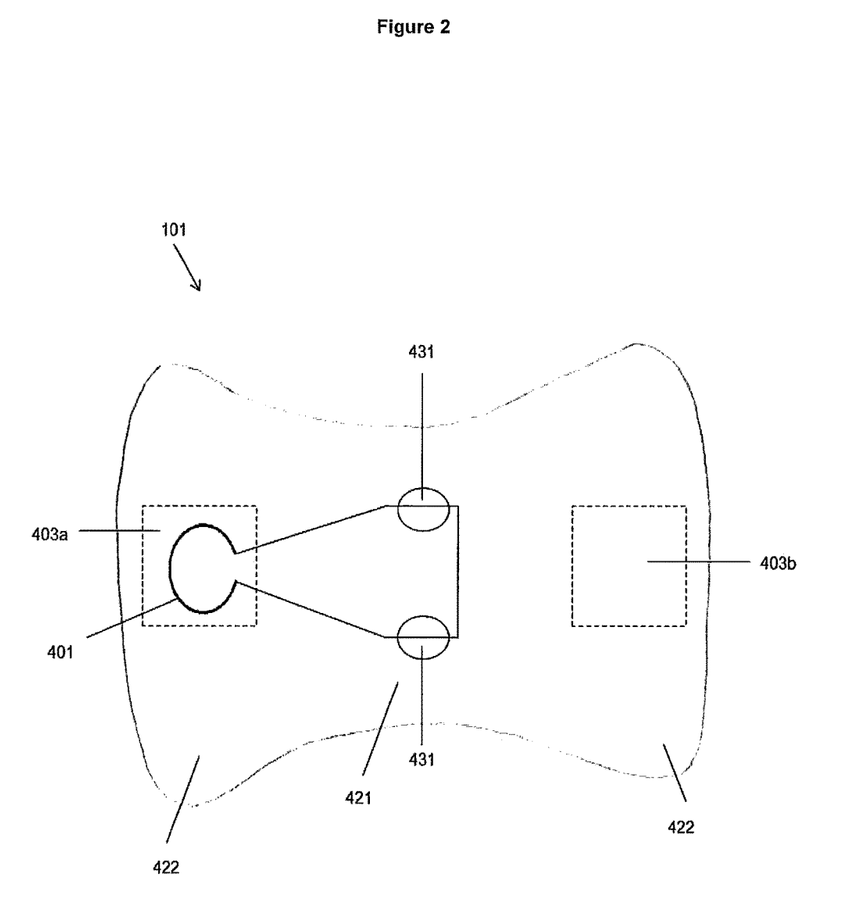
FIG. 2 is a cross-sectional plan view diagram of the detection tag shown in FIG. 1.

FIG. 1 is a cross-sectional side view diagram of a detection tag 101 according to one embodiment of the invention. FIG. 2 is a cross-sectional plan view diagram of the detection tag 101 shown in FIG. 1.

The detection tag 101 comprises an adhesive layer 407 which is used to attach the tag to the back or rump of an animal. It is preferably a layer of weather-proof adhesive but any adhesive may be used, including those described in PCT/NZ2011/000097, the contents of which are hereby incorporated by reference. Furthermore the adhesion to the animal can be greatly improved by applying an aerosol glue approximately 5 minutes prior to applying the tag. This method is especially useful when attaching the tag on animals with wet/damp fur. The adhesive layer 407 is covered by a peel-off layer 409 which is removed when the tag is attached to an animal.

The detection tag 101 also comprises first and second electronic signal transmission means 403a and 403b, which may take the form of an RF/EAS circuit/microchip in a RFID tag/EAS tag layer. The first and second electronic signal transmission means 403a and 403b transmit electronic signals that have detectably different characteristics such that the signal transmitted from chip 403a can be distinguished from the signal transmitted from chip 403b by one or more suitable signal detection devices. Examples of such different characteristics will be discussed further below.

As can be seen in FIG. 2, the chips 403a and 403b are positioned laterally apart in tag layer 403. In the embodiment shown in FIG. 2, the detection tag 101 is 'bone shaped' with side wing areas 422 connected by a centre neck portion 421. The chips 403a and 403b may each be positioned in a separate wing area 422.

The bone-shaped design allows the tag 101 to be affixable to the hide of an animal (especially to the rear spinal area) with the centre neck portion 421 of the tag designed to be placed on top of the spinal bone of the animal. The larger 'wing' areas 422 on both sides of the tag are designed to hold the neck portion firmly in place and the bone-shaped design maximises the attachment area of the tag. The design of the tag further allows the neck portion 421 to be small and flexible. However in alternative embodiments, the tag can be made to any other desired shape and size.

The chips 403a and 403b may be covered above and/or below by lamination or protective layers 411 and 405. The layers 411 and 405 may be made from a durable and waterproof material and can be injection moulded, hot-laminated, glued or welded to the tag to avoid delaminating during use. The purpose of these layers is to provide protection from damage to the chip/circuits 403a and 403b from impacts by other animals, and from the weather.

One or more patches 431 of material are positioned above the layer of chips 403a and 403b and are configured to aid abrasion or breaking of a circuit (described below) passing above and over the patches 431. The patches 431 are preferably positioned on or near the central neck portion 421 since, in use, this portion is designed to be positioned over the spinal bone of the animal where abrasion is likely to occur when the animal is mounted. The patches may be formed of scratchy material similar to the latex scratchy layer of lottery tickets.

Above the patch layer is a signal shielding layer comprising signal shielding means 401 able to shield electronic signals transmitted by one of the chips 403. In the embodiment of FIGS. 1 and 2, the signal shielding means comprises a conductive circuit 401. The conductive circuit 401 is a RF/EMF blocking conductive circuit/loop of conductive material (round or otherwise), preferably a ring of aluminium foil, an aluminium 'sticker' type (self-adhesive) ring, a painted-on ring of conductive paint, silver ink, or a conductive liquid material contained circular tube or bladder. The ring 401 is either printed or glued on to the tag (the ring being self-adhesive or otherwise), contained in a special pocket or sleeve of the tag, or held on the top of the tag by ridges/rubber bands. It should be noted that the tag with the ring attached using special pockets, sleeves or ridges is relatively easier to manufacture in an automated and consistent way than a tag having a glued on/self-adhesive ring. Also the sticker-type (self-adhesive) ring was shown to be very prone to accidental breaking during trials. Therefore, it is envisioned that the tag with the sleeve/pocket/rubber-band attachment of the ring would protect the ring well from accidental breaking during use while still being able to be activated by a representative amount of rubbing. In another embodiment the rings are screen printed on the tag using silver ink or another conductive ink.

The conductive circuit 401 is positioned such that it is likely to be damaged or removed from the surface of the detection tag upon mounting of an animal. The conductive circuit 401 forms an inductive loop when it experiences an RF/EMF field and hence it dissipates most of the energy in the RF/EMF field. Therefore it blocks the RF/EMF field from leaving the detection tag and prevents the first chip from becoming activated. However once the circuit/loop 401 is broken partially or completely (i.e. even a small cut in the aluminium foil or a tiny scratch through the conductive paint ring) the RF/EMF energy is no longer dissipated and the shielded signal of the first chip becomes readable by a suitable signal reader.

In the embodiment of FIG. 2, the conductive circuit 401 is in the approximate shape of a keyhole. The loop part of the circuit 401 is positioned over one of the chips 403*a* and the tail of the circuit 401 is positioned over the neck 421 of the tag in such a way that the circuit 401 also passes over the patches 431, where the circuit (which is made of abradable material) is prone to be broken by a mounting animal. In other embodiments of the invention, other shapes of circuits are provided. Any shape can be used that forms a signal shielding structure over one of the chips and passes over the abradable patches.

A further protective layer 441 may be provided over the top of the conductive circuit. Layer 441 may comprise a varnish. The varnish may be transparent or coloured. The varnish layer 441 is provided over all areas of the tag except above the patches 431, where a hole in the varnish layer is left. The varnish layer helps to protect most of the conductive circuit 401 from damage on abrasion by an animal, except the areas of the circuit 401 positioned over the patches 431.

A layer of scratchy material 451 may also be provided over the top of the varnish layer 441. The layer of scratchy material 451 is removed when the animal to which the tag is affixed is mounted. An easily visible colour contrast may be provided between the scratchy material layer 451 and the layer 441 underneath to give a visual indication that the scratchy layer 451 has been abraded and therefore the animal has been mounted.

Indication of Status of Animals

In order for the tags 101 to indicate the in heat' status of the animals under inspection (i.e. whether the animals have been mounted or not), the electronic transmission signals of the tags or various different characteristics of the electronically transmitted signals of the tags 101 are set to change when mounting occurs. More particularly, the detection tags are configured such that the removal of some or all of the abradable material alters the ability of the tags to transmit one of the electronic transmission signals electronically or alters one or more characteristics of one of the electronically transmitted signals. These variations and characteristics are explained below along with details on how to implement each of them.

In general, detection of one of the two chips in the detection tag provides an indicator of the status of the animals, while detection of the other chip provides an indicator of the presence of the detection tag itself.

EXAMPLE 1

In the embodiment of the invention shown in FIGS. 1 and 2, the electronic signal transmitted by the chip 403*a* is shielded by the conductive circuit 401 when the tag has not been activated. In this state, a suitable tag reader is able to detect the signal from chip 403*b* but not chip 403*a*. The signal characteristics of the signal from chip 403*a* are detectably different from the signal characteristics of the signal from chip 403*b*. Therefore a tag reader can determine that it is the chip 403*b* being detected and the detection tag 101 is in an inactive state.

When the animal to which the tag is affixed has been mounted, the abradable material constituting the conductive circuit 401 is removed over the scratchy patches 431. This breaks the conductive circuit, preventing the signal from chip 403*a* from being shielded. The tag reader is therefore able to detect the signal characteristics of the signals from both chips 403*a* and 403*b*. Therefore it can be determined that the detection tag 101 has been activated and the animal to which it is affixed is 'in heat'.

If the detection tag 101 should fall off an animal, a tag reader will detect no signals from the animal. Therefore it can be determined that the detection tag is missing. The absence of any signal does not lead to any ambiguity between an inactive tag and a missing tag, as with some prior art systems. It will be understood that, to determine that the detection tag is missing in the absence of any signals from an animal, it must first be determined that an animal is present (i.e. within range of the tag reader). An animal monitoring system according to the invention may therefore include means for detecting the presence of an animal within range of the tag reader. Non-limiting examples of such animal presence detection means include: proximity sensors, optical sensors (including, for example, object imaging and detection means), beam interrupter sensors (i.e. an animal is detected if it prevents a beam of light, e.g. infra-red waves, from being detected by a sensor) and the like. In some embodiments, the detection of another tag may be used to detect the presence of an animal within range of the tag reader configured to read the detection tag of the present invention. For example, an RFID tag mounted on an animal and storing identification data about the animal, such as is commonly attached to an animal's ear, may be detected by a suitable RFID tag reader to detect the presence of an animal.

The tag reader may provide an output to an interpretation module of a processing device. The interpretation module is preferably a software program on a computer with an output display indicating the state of the animal. Preferably, the computer could be part of other automated systems frequently installed in (dairy) farms.

A summary of the possible detection scenarios and their implications is shown in the table below:

| Animal presence under reader | Signal - characteristic 1 | Signal - characteristic 2 | Tag status |
|---|---|---|---|
| Detected | Not detected | Detected | Inactive |
| Detected | Detected | Detected | Active |
| Detected | Not detected | Not detected | Missing |

The invention is not limited by the detectable characteristic that differs between the signals from the two chips 403a and 403b. The following is a non-limiting list of the one or more characteristics that may differ between the two signals and therefore be detected to allow the tag reader or tag readers to determine which signals are detected:

Frequency—the two signals have different frequencies and/or frequency bandwidths;

Code—the two signals include different codes. The codes may be encoded in the signals in any appropriate manner, for example if the chips are RFID chips, the IDs of the RFID chips differ.

Time—the two signals may be detectable at different times in a similar manner to time-division multiplexing.

Signal type—the two signals may be of different types. This may mean, for example, that the signals are detectable by two distinct types of signal readers. For example, one of the chips may transmit an RF signal (e.g. from an RFID chip) while the other chip transmits a magnetic signal (e.g. from an EAS chip).

Interaction—the two signals may interact to provide a third signal having detectably different characteristics to either of the first two signals when both are active.

EXAMPLE 2

In another example, the detection tag may be configured such that the electronic signals from both chips are detectable when the tag is in an inactive state and activation of the tag resulting from an animal mounting the animal to which the tag is affixed results in the signal from one of the chips being shielded.

Mechanisms by which the signal from one of the chips can be transmitted when the tag is inactive (i.e. before mounting) but the signal is shielded when the tag has been activated (i.e. after mounting) are discussed in PCT/NZ2011/000097.

In this example, the following table summarises the possible detection scenarios and their implications to the status of the tag.

| Signal - characteristic 1 | Signal - characteristic 2 | Tag status |
|---|---|---|
| Detected | Detected | Inactive |
| Not detected | Detected | Active |
| Not detected | Not detected | Missing |

Again, the tag status can be used to determine the reproductive status of the animal.

As with example 1, the signal characteristics that differ between the two signals may be any detectable characteristic.

As with example 1, the system may include means for detecting the presence of an animal within range of the tag detector in order to distinguish between a missing tag and the absence of an animal.

EXAMPLE 3

In another example, the detection tag may be configured such that the electronic signals from both chips are detectable when the tag is in an inactive state and activation of the tag resulting from an animal mounting the animal to which the tag is affixed results in the signal from one of the chips being altered in some way. For example, the frequency or strength of the signal from one of the chips may be altered. Mechanisms by which the signal from one of the chips can be altered after the tag has been activated (i.e. after mounting) are discussed in PCT/NZ2011/000097.

Alternatively, any one or more of the signal characteristics listed above may differ between the inactive tag and the active tag.

In this example, the following table summarises the possible detection scenarios and their implications to the status of the tag.

| Signal - characteristic 1 | Signal - characteristic 2 | Tag status |
|---|---|---|
| Detected | Detected | Inactive |
| Altered | Detected | Active |
| Not detected | Not detected | Missing |

In one embodiment of the invention conductive ink is printed on the detection tag to provide two complete or partial EAS circuits, one part of the circuits being in parallel with the other such that the parallel circuits have a first predetermined impedance (e.g. resistance, capacitance or inductance) value and consequently transmits a signal having a first frequency. The tag in this embodiment is configured such that at least part of one of the parallel circuits is abradable to break that part of the circuit. This results in the resulting circuit having a different impedance to the unbroken parallel circuits. Consequently the resonant frequency of the resulting circuit is different from the unbroken parallel circuits and the emitted signal has a different frequency from the signal emitted from the unbroken circuit. The printed circuits are configured such that the difference in frequency between the unbroken and broken states of the circuit can be detected by a suitable signal reading device to ascertain whether the tag has been activated, or when no signal is present at all, if the tag is missing.

As with examples 1 and 2, the system may include means for detecting the presence of an animal within range of the tag detector in order to distinguish between a missing tag and the absence of an animal.

Flood Coat Layer Version

In an alternative embodiment of the invention, the detection tag comprises a layer of RF/EMF shielding or absorbing material over the chip that is used to indicate the status of the animal. This blocking layer (referred to as a 'flood coat layer' hereinafter) is similar to the coating of 'scratchy' lottery tickets. It comprises of a conductive material such as paint with ferrite powder and has RF or EMF shielding or absorption properties which prevent RF reception in the tag.

The flood coat layer may shield only one of the chips by covering only part of the detection tag, in particular by covering the area of the tag directly above one of the chips. Therefore in the inactive state, the signal from the chip that is not covered can be detected by a signal reader to determine that the tag is present but inactive. The flood coat layer is abraded on the animal being mounted by another animal, which results in part or complete removal of the mechanism for blocking the signal from that chip, and therefore the signal from the previously covered chip can be detected to indicate the tag is in the active state.

Detection/Drafting Method

As described in the background section, the current processes of manual and automated drafting of animals have some disadvantages. In one example, the detection system of the current invention is integrated into or replaces various parts of the drafting process overcoming those disadvantages as detailed below.

Figure 3:
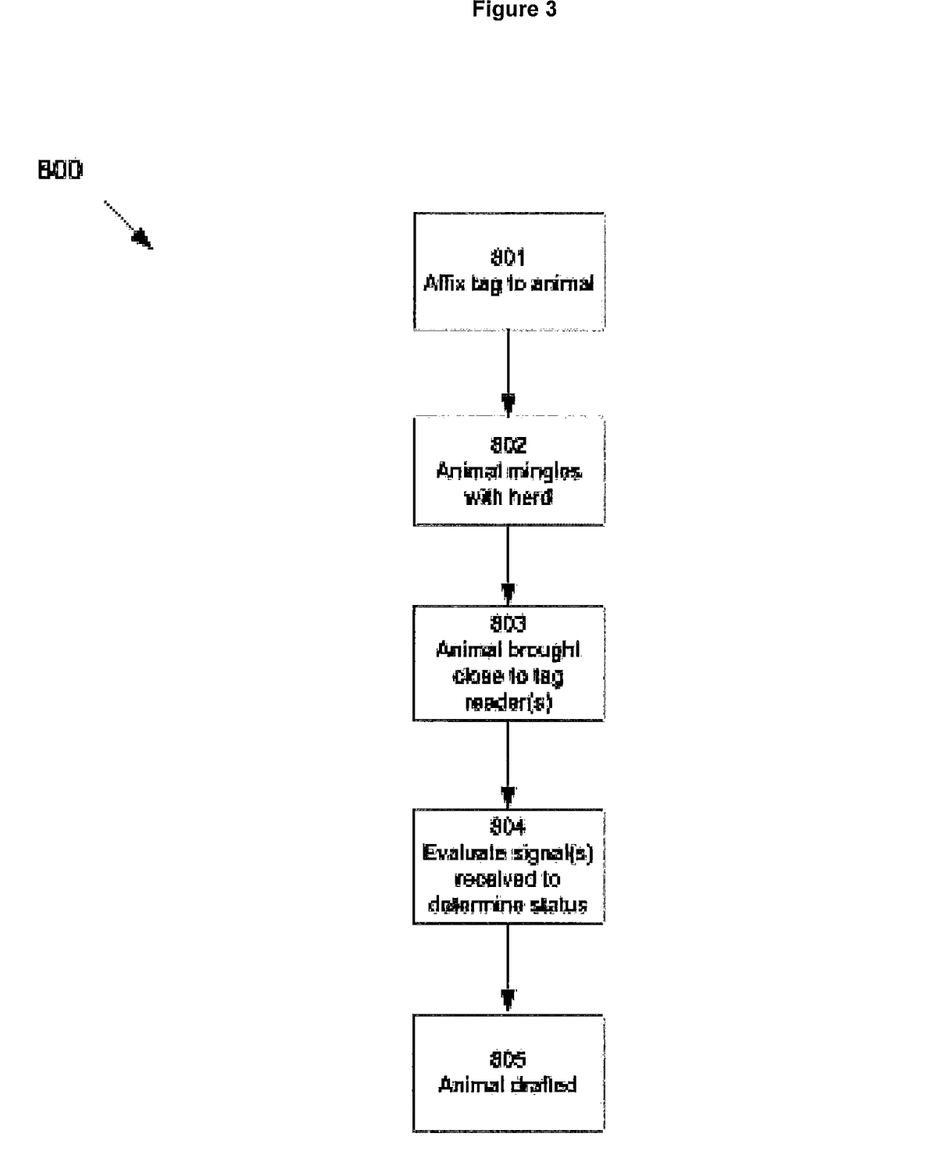
FIG. 3 is a flow chart diagram illustrating a method of detecting the reproductive state of an animal and drafting that animal according to one embodiment of the invention.

A generic drafting method according to the present invention is illustrated in FIG. 3, which is a flow chart diagram illustrating a method 800 of detecting the reproductive state of an animal and drafting that animal according to one embodiment of the invention.

The method comprises, at step 801, affixing a detection tag according to any of the embodiments of the invention explained herein onto a female animal. At step 802, the animal is allowed to mingle with animals of the same type for a period of time. Then, at step 803, the animals are brought into close proximity to one or more chip/tag reading devices, the number and type of devices being suitable to read the signals transmitted by the two chips in the detection tag. In one example, the cows may be passed by the detection tag reading devices. For example the detection tag reading device could be mounted above the area where cows exit a milking parlour. In another example the one or more detection tag reading devices are brought to the animals, for example by way of a hand held detection tag reading device. At step 804 the signal(s) from the detection tag (or lack of signals from the animal) are read and evaluated by an interpretation module on a suitable processing device to determine the status of the tag (i.e. present/missing and inactive/active or altered/unaltered) and therefore of the animal (i.e. in heat' or not). Finally, at step 805, in a drafting situation, the animal is allowed to be drafted to a correct location based on the detected signal(s). Specific examples of this generic method will now be described.

One low level implementation of use of the detection system involves a farmworker using a handheld tag reader that, when used to scan an animal (for example by bringing the reader into proximity with the tag on the animal) has a visual or audible output signal to indicate whether the animal's respective tag has been activated. If a positive indication is given, the farmworker can either mark the animal for drafting, communicate in some manner to a colleague that the animal should be drafted, or manually draft the animal themselves, for example if the farmworker is located at the drafting gate.

Another level of implementation of having the detection system integrated into the drafting process involves placing a tag reader according to embodiments of the invention as described above on the exit race of a milking parlour. When a cow is picked up by the reader as being 'in heat', a light, sound or other signal is brought to the attention of a gate operator who operates the drafting gate accordingly. This implementation eliminates the step of having a skilled farm worker for identifying and manually marking cows with, for example, shaving cream, thus reducing the possibility of missing a cow 'in heat'. Furthermore there is no need to know the cow's ID as the cow is drafted immediately upon detection by the operator and hence expensive hardware is not required for the identification of cows in heat. This system would work well in low-tech farms with small herd numbers and it would operate in both rotary as well as herringbone milking sheds.

The next level implementation is similar to the lowest level implementation described above but instead or in addition to having the tag reader giving out a light or a sound when an in heat' cow is detected, the system also operates the gate through an actuator of some sort (e.g.: a hydraulic actuator). This replaces the skilled farm worker as well as the gate operator. Thus two or three steps of the drafting process (i.e. identifying, (marking) and operating the gate) are performed by the system automatically.

In a third implementation, the detection system of this invention is combined with either commercially available or specially developed farming systems to operate as part of a more integrated drafting system. Typically in this scenario, the tag reader is not necessarily located at the exit race of the milking parlour. It is located anywhere before the exit together with a separate animal identification tag reader (e.g. commercial RFID ear-tag reader). In this integrated drafting system, when the tag reader of this invention picks up a cow as being in heat', the integrated system will store this information against the cow's ID that is read at the same time using the animal identification reader. When this cow passes through the exit gates, a second animal identification reader will read the cow's ID for second time. This ID is then compared to the list of stored IDs in the system and when a cow that has been marked as in heat' passes through the region of the animal identification reader before the gate, the system would then operate the gate to draft the cow accordingly. This implementation replaces the skilled worker of prior art automated drafting systems that would normally identify and mark the cow for drafting by entering its ID into a database either manually or automatically by pressing a button. The gate operator is also replaced by the automated operation of the gate.

In these implementations, if a cow is detected as having a tag missing (i.e. by lack of detection of the signal associated with the 'always-active' or presence-indicator chip) an appropriate signal may be provided. The farm workers are then informed about the missing tag and may be able to make a determination on the cow's 'in heat' status using their experience, and be drafted accordingly. Alternatively, the cow with a missing tag may be automatically drafted to a different location, such as a holding stall or the like, where all cows with missing tags in the herd may be judged together before being drafted appropriately. In addition, or instead, cows with missing tags may have new tags added before or after drafting.

Variations

The detection tags of this invention are preferably non-visual detection tags such as, for example, RFID or EAS tags and the tag readers used in this invention can be of any type used in the prior art. RFID and EAS tags are currently in wide use to detect (or identify) specific states as indicated by the tag and the same technology can be incorporated in this invention.

Electronic indicator tags/readers, commonly referred to as RFID tags/readers in the industry, are classified into several categories according to operational frequency. They are low frequency RFID (125 KHz, 134 KHz short range (0.5 m)) which are good for detecting water containing objects (i.e.: animals), high frequency RFID (13.65 Mhz. longer range (1 m)) which have an average ability to detect water/metal containing objects, ultra high frequency (860 to 930 MHz up to 3 m range) which are not good for detecting objects with water/metal and microwave RFID (2.45 to 5.8 Ghz limited range, expensive) which cannot be used for detecting water/metal containing objects. Therefore when using RFID detection systems, either a low or high frequency RFID tag/reader system is most suitable for use in this invention. However other systems can be used as desired in various other implementations.

Furthermore electronic article surveillance (EAS) tags/readers (sometimes referred to as identification tags, RFID tags or RF tags or 1 bit RF tags in the industry) are also classified into several categories according to their form of communication. The transmitter and the receiver of the EAS readers are sometimes combined into one single module but are usually found as two separate modules (e.g.: check-out gates at retail stores). Types of EAS tags/readers include magnetic (magneto-harmonic), acousto-magnetic (magneto-strictive), radio frequency and microwave EAS systems of which radio frequency (RF) EAS systems are the most suitable type for the implementation of this invention. However implementations using other types of EAS tags are also possible.

For example, an implementation using magnetic/acousto-magnetic EAS tags involves the use of a tag which is physically damaged (completely or partially) during mounting action such that one of the tag signals is no longer detected by the reader. In an alternative implementation, one of the magnetic/acousto-magnetic EAS chip tags is shielded by a layer of magnetised paint which is removed during mounting action. In a further alternative, the status of the magnetic/acousto-magnetic chips can be made to be changed by attaching the mounting animal with a magnetising device which changes the state of the magnetic/acousto-magnetic chip secured on the female animal when mounted.

The interpretation module disclosed in the specification can be installed as a software program on any type of computer including an embedded system as mentioned previously. It can be a laptop computer with a USB tag reader connected or a handheld device specifically made for interpreting the signal from the tag reader. It has a display to output whether the status of the scanned animal has changed or not. The results are preferably stored in a computer database and preferably the computer is integrated with or is part of existing farm automation systems.

Another method of providing visual confirmation to a farmer is to combine the current system of this invention with one of the prior art visual/manual detection systems e.g. to use the tags of the current system along with tail paint on animals to confirm the reproductive status indicated by the tags. This proves to be an easy option to give the farmer some confidence and/or to identify accidental breaking of rings of the tags from 'real-heat' indication.

Preferably the detection tags disclosed in all examples of this specification are tapered at the edges to decrease the chance of the tag being removed during use (i.e. when an animal is being mounted). All protective layers of the tags (e.g. 405 and 411 as shown in FIG. 1) may be tapered.

Furthermore the bottom protective layer of the tag may be made thicker (for layer 405 as shown in the side-view diagram of FIG. 1) at the centre of the tag, for example by approximately 2 mm. In the trials conducted by the inventor this was achieved by having a 2 mm foam sub-layer in the protective layer 405. The foam sub-layer can be omitted if the protective layer 405 is manufactured to have a centre thickness of 2 mm without the use of a foam layer. The thicker centre portion of the tags ensures a 2 mm separation between the electronic tag 403 and the animal skin resulting in an increased read-rate of the tags. Optionally the tag will be pre-shaped to follow the contours of the animal's back spine although this might not be necessary if the material of the protective layer 405 of the tag can be both thick and supple.

The layers of the detection tags 101 are not limited to the layers as described and shown in FIG. 1. Furthermore the layers may not necessarily be in the same order as disclosed in this specification and illustrated in the figures. In alternative embodiments of the invention, some layers may be omitted such as, for example, layers 411 and/or 407 and in further alternative embodiments, additional layers may be added to the tags as desired by various manufacturers. For example, the adhesive layer 407 and peel off layer 409 may be omitted by some manufacturers and be replaced by special attachment layers which attach the tags to animals using tag clips or special strings/rubber bands which tie the tags to the body of the animals. Other embodiments may exclude the protective lamination layers 411 and 405 and provide protection for the tag layer 403 by having other means such as plastic sleeves or pockets which secure the tags 403.

The terms 'RFID tags', 'EAS tags' and RFID/EAS tags' as used in this description includes all types of RFID/EAS type tags and all other existing electronic tag types available in the market. More particularly the term 'RFID tag' is not necessarily limited to tags which store identification data and also includes all types of RF tags which detect/identify particular states of a tag (even if it does not store or send/receive identification data). Since the term 'RFID tags' is used in the industry to cover both RFID tags and RF tags and is more generally used to refer to any tag which uses radio frequency to indicate one or more states or conditions, it is used in the broadest possible sense of the term in this description.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A detection tag for detecting of a reproductive status of animals, the detection tag comprising:

a first surface configured to be fixed to a hide of an animal;

a second and opposite surface including an abradable material;

a first electronic signal transmitter configured to transmit a first electronic signal;

a second electronic signal transmitter spaced apart from the first electronic signal transmitter and configured to transmit a second electronic signal, the first and second electronic signals having delectably different characteristics; and a signal shield shielding one of the first or second electronic signal transmitted by the first or second signal transmitters such that only the electronic signal from the other first or second electronic signal transmitters is transmitted from the detection tag;

the detection tag being configured such that removal of some or all of the abradable material damages or removes the signal shield such that the electronic signal produced by said one of the first and second electronic signal transmitters is no longer shielded and the electronic signal from both the first and second electronic signal transmitters are transmitted from the tag.

2. A detection tag as claimed in claim 1, wherein the first and second electronic signals have different frequencies.

3. A detection tag as claimed in claim 1, wherein the detectably different characteristics of the first and second electronic signals comprise any one or more of:

a) differently coded signals;

b) differently time-divided signals; and/for c) signals detectable using different types of detector.

4. A detection tag as claimed in claim 1, wherein each of the first and second electronic signal transmitters comprises a 'Radio Frequency Identification' (RFID), or an 'Electronic Article Surveillance' (EAS), electronic circuit or micro chip.

5. A detection tag as claimed in claim 1, wherein the abradable material includes the signal shield.

6. A detection tag as claimed in cam 5, wherein the signal shield comprises a conductive circuit and the detection tag is configured such that partial or complete removal of the conductive circuit, or breaking of the conductive circuit, allows the transmission of the first signal.

7. A detection tag as claimed in claim 6, wherein the conductive circuit of the detection tag is configured such that it is damaged or broken partially or completely when the animal is mounted by another animal.

8. A detection tag as claimed in claim 6, wherein the detection tag comprises one or more patches of material positioned under the conductive circuit, the patch material being configured to aid abrasion or breaking of the conductive circuit where the conductive circuit passes over the one or more patches.

9. A detection tag as claimed in claim 5, wherein the abradable material is a removable flood coat layer comprising the signal shield.

10. A system for detecting the reproductive of an animal, wherein the system comprises at least one detection tag according to claim 1 and at least one tag reading device and/or interpretation module which is configured to interpret the signals from the detection tag.

11. A method of detecting the reproductive state of an animal, the method comprises the steps of:

affixing a detection tag according to claim 1 onto a female animal;

allowing the female animal to mingle with other animals for a period of time;

placing the female animal in close proximity to one or more detection tag reading devices;

evaluating the presence or absence or specific characteristics of one or more signals from the detection tag, and making a determination as to the reproductive state of the female animal; and allowing the animal to be drafted to a correct location based on the detected signal.

* * * * *